(12) United States Patent
Chua et al.

(10) Patent No.: US 9,348,501 B2
(45) Date of Patent: May 24, 2016

(54) TOUCH MODES

(75) Inventors: Fei H. Chua, Bellevue, WA (US); Brian C. Beckman, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 13/523,156

(22) Filed: Jun. 14, 2012

(65) Prior Publication Data

US 2013/0335337 A1  Dec. 19, 2013

(51) Int. Cl.
  *G06F 3/0488* (2013.01)
  *G06F 3/0354* (2013.01)

(52) U.S. Cl.
  CPC .......... *G06F 3/0488* (2013.01); *G06F 3/03547* (2013.01)

(58) Field of Classification Search
  CPC ..................... G06F 3/0488; G06F 3/03547
  USPC ................................................. 345/173, 174
  See application file for complete search history.

(56) References Cited

U.S. PATENT DOCUMENTS

| | | | | |
|---|---|---|---|---|
| 7,605,804 B2* | 10/2009 | Wilson | ........................ | 345/173 |
| 7,640,518 B2* | 12/2009 | Forlines | ................ | G06F 3/0488 345/156 |
| 8,643,616 B1* | 2/2014 | Zhang et al. | ................... | 345/173 |
| 2009/0002332 A1* | 1/2009 | Park et al. | ..................... | 345/173 |
| 2009/0189878 A1 | 7/2009 | Goertz et al. | | |
| 2009/0284478 A1* | 11/2009 | De la Torre Baltierra et al. | ............................ | 345/173 |
| 2010/0088596 A1* | 4/2010 | Griffin et al. | ................. | 715/702 |
| 2010/0156813 A1* | 6/2010 | Duarte et al. | ................. | 345/173 |
| 2010/0193258 A1 | 8/2010 | Simmons et al. | | |
| 2010/0302144 A1 | 12/2010 | Burtner et al. | | |
| 2010/0328209 A1 | 12/2010 | Nakao | | |
| 2010/0328227 A1 | 12/2010 | Matejka et al. | | |
| 2010/0328236 A1 | 12/2010 | Ma | | |
| 2011/0074677 A1 | 3/2011 | Ording et al. | | |
| 2011/0227947 A1 | 9/2011 | Benko et al. | | |
| 2012/0007805 A1* | 1/2012 | Kim | ..................... | G06F 3/0488 345/159 |
| 2012/0044164 A1* | 2/2012 | Kim et al. | ..................... | 345/173 |

OTHER PUBLICATIONS

"Windows Phone: Designing Touch Targets", Retrieved at <<http://windowsphonegeek.com/news/Windows-Phone-Designing-Touch-Targets, Feb. 2, 2012, pp. 2.
"International Search Report and Written Opinion", Application No. PCT/US2013/044188, (Sep. 4, 2013), 8 pages.

\* cited by examiner

*Primary Examiner* — Quan-Zhen Wang
*Assistant Examiner* — Xuemei Zheng
(74) *Attorney, Agent, or Firm* — Timothy Churna; Sergey Lamansky; Micky Minhas

(57) ABSTRACT

Touch modes are described. In one or more implementations, a first mode of interaction is supported with a user interface displayed by a display device of a computing device having touchscreen functionality, the first mode usable to interact directly with a user interface using the touchscreen functionality. A second mode of interaction is supported with the user interface displayed by the display device of the computing device, the second mode usable to control a cursor using the touchscreen functionality to interact with the user interface.

20 Claims, 9 Drawing Sheets

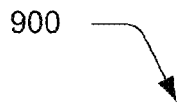

```
┌─────────────────────────────────────────────────┐
│                      902                         │
│ Support a first mode of interaction with a user  │
│ interface displayed by a display device of a     │
│ computing device having touchscreen              │
│ functionality, the first mode usable to interact │
│ directly with a user interface using the         │
│ touchscreen functionality                        │
└─────────────────────────────────────────────────┘
                         ↓
┌─────────────────────────────────────────────────┐
│                      904                         │
│ Support a second mode of interaction with the    │
│ user interface displayed by the display device   │
│ of the computing device, the second mode usable  │
│ to control a cursor using the touchscreen        │
│ functionality to interact with the user interface│
└─────────────────────────────────────────────────┘
```

*Fig. 9*

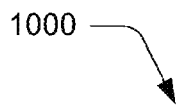

1002
Detect an object as proximal to a display device of a computing device using touchscreen functionality

1004
Control a cursor displayed as part of user interface by the display device, the controlling based at least in part on the detection of the object in relation to the display device as proximal to the display device but is independent of a location of the display device at which the object is detected using the touchscreen functionality

*Fig. 10*

TOUCH MODES

BACKGROUND

Touchscreen functionality is employed by an ever increasing variety of devices. This may include devices that have a mobile form factor such that the touchscreen functionality may be used as a primary technique to interact with the device, thereby preserving a mobile form factor of the device and promoting larger display devices in that form factor.

However, due to this form factor it may be difficult to interact with user interfaces that are not designed for that form factor. A user, for instance, may access a webpage or legacy application that is designed for use on a conventional desktop personal computer. A CAD application, for instance, may have difficulty in accurately determining X-Y coordinates or selection of relatively small objects displayed by a display device, which is often referred to as the "fat finger" problem.

Consequently, conventional techniques often involved rewriting the application and other user interfaces to enable use by a device having a mobile form factor, reformatting of a webpage, and so on. This could be expensive, inefficient, and result in reduced functionality due to missing elements that were removed from that version.

SUMMARY

Touch modes are described. In one or more implementations, a first mode of interaction is supported with a user interface displayed by a display device of a computing device having touchscreen functionality, the first mode usable to interact directly with a user interface using the touchscreen functionality. A second mode of interaction is supported with the user interface displayed by the display device of the computing device, the second mode usable to control a cursor using the touchscreen functionality to interact with the user interface.

In one or more implementations, an object is detected as proximal to a display device of a computing device using touchscreen functionality. A cursor displayed as part of user interface by the display device is controlled, the controlling based at least in part on the detection of the object in relation to the display device as proximal to the display device but is independent of a location of the display device at which the object is detected using the touchscreen functionality.

In one or more implementations, a device includes a display device having touchscreen functionality configured to detect an object as proximal to the display device and one or more modules. The one or more modules are configured to implement a first mode to support direct interaction with a user interface, displayed by the display device, that is dependent on a detected location of the object as proximal to the display device using the touchscreen functionality and a second mode to control a display of a cursor in the user interface, the control independent of the location at which the object is detected as proximal to the display device using the touchscreen functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 9 depicts a procedure in an example implementation in which different modes of interaction are supported for a display device having touchscreen functionality.

FIG. 10 depicts a procedure in an example implementation in which detected proximity of an object to a display device is used to control a cursor.

DETAILED DESCRIPTION

Overview

Conventional touchscreen systems could suffer from a "fat finger" problem as previously described in which it was difficult for a use to interact with an item in a user interface. This could be due to a size of an item, a location of the item as close to other items that may also be selectable in the user interface, and so on.

Touchscreen mode techniques are described herein. In one or more implementations, a first mode is supported in which a user may directly interact with items displayed in a user interface. For example, a finger of a user's hand may be detected as proximal to a selectable item in a user interface and thus the user may directly interact with that item. A second mode may also be supported in which a user interacts using the touchscreen functionality indirectly with the user interface. This may include use of the touchscreen functionality to control movement and other functionality involving a cursor that is displayed in the user interface. A user, for instance, may interact with the touchscreen functionality to control the cursor similar to interaction performed using a track pad.

In the following discussion, an example environment is first described that is operable to employ the touchscreen mode techniques described herein. Example illustrations of gestures and procedures involving gestures and other inputs are then described, which may be employed in the example environment as well as in other environments. Accordingly, the example environment is not limited to performing the example techniques. Likewise, the example procedures are not limited to implementation in the example environment.

Example Environment

Figure 1:
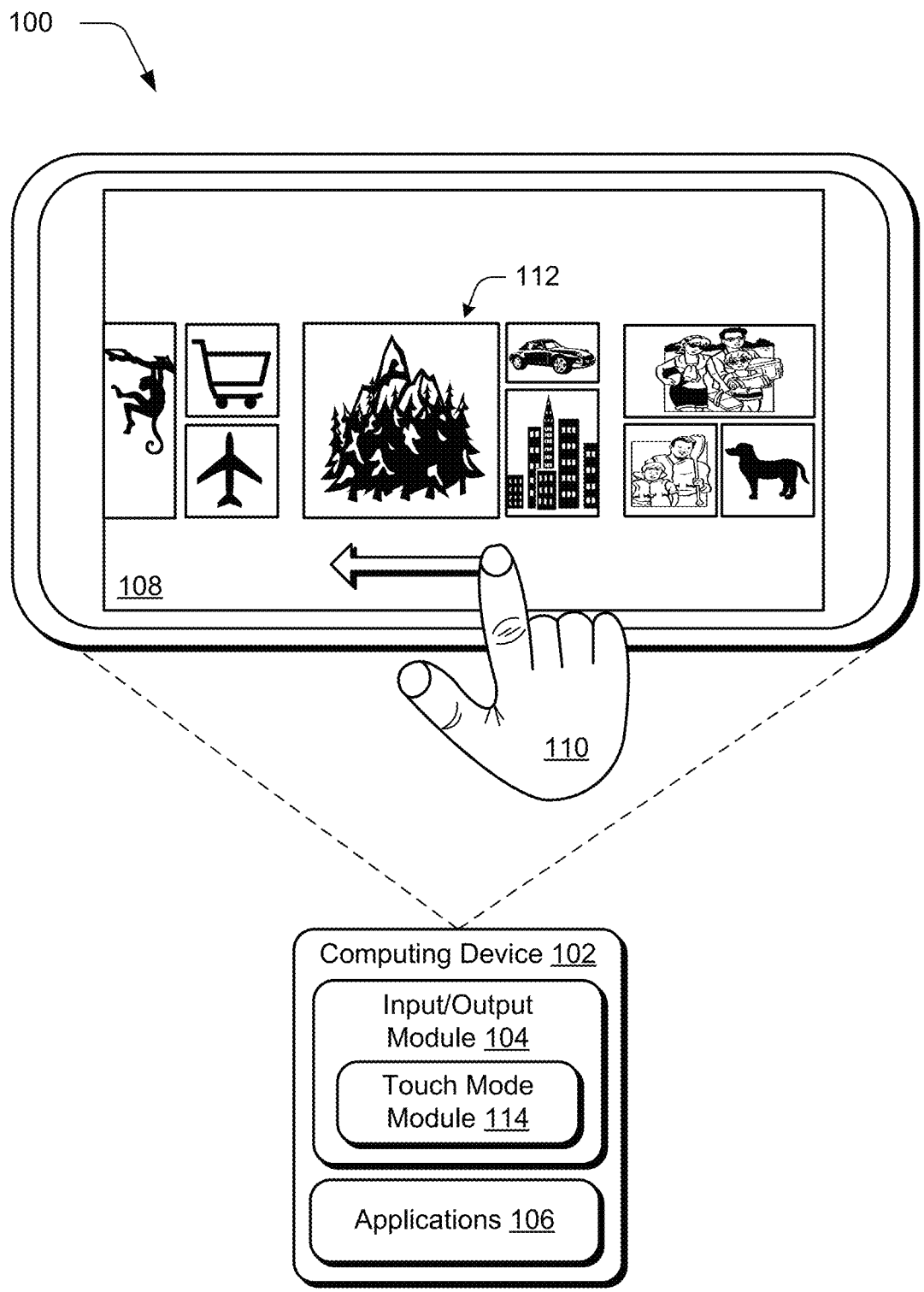
FIG. 1 is an illustration of an environment in an example implementation that is operable to employ touch mode techniques. mom

FIG. 1 is an illustration of an environment 100 in an example implementation that is operable to employ touch-screen mode techniques described herein. The illustrated environment 100 includes an example of a computing device 102 that may be configured in a variety of ways. For example, the computing device 102 may be configured to include a processing system and memory. Thus, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 11.

Accordingly, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including an input/output module 104. The input/output module 104 is representative of functionality relating to inputs detected by the computing device 102. For example, the input/output module 104 may be configured as part of an operating system to abstract functionality of the computing device 102 to applications 106 that are executed on the computing device 102. In another example, the computing device 102 may implement a terminals services scenario where the computing device 102 is connected to and used to control yet another computing device.

The input/output module 104, for instance, may be configured to recognize a gesture detected through interaction with a display device 108, an example of which is illustrated as detecting proximity of an object (e.g., one or more fingers of a user's hand 110) as proximal to the display device 108 using touchscreen functionality. The display device 108, for instance, may include one or more sensors to detect this proximity, include resistive, capacitive, strain, acoustic wave, image capture, and so on. Thus, the input/output module 104 may be representative of functionality to identify gestures and cause operations to be performed that correspond to the gestures.

The touch input may also be recognized as including attributes (e.g., movement, location, magnitude, and so on) that are usable to differentiate the touch input from other touch inputs recognized by the input/output module 104. This differentiation may then serve as a basis to identify a gesture from the touch inputs and consequently an operation that is to be performed based on identification of the gesture.

For example, a finger of the user's hand 110 is illustrated as being placed proximal to the display device 108 and moved to the left, which is represented by an arrow. Accordingly, detection of the finger of the user's hand 110 and subsequent movement may be recognized by the input/output module 104 as a "pan" gesture to navigate through representations of content in the direction of the movement.

In the illustrated instance, the representations are configured as tiles 112 that are representative of items of content in a file system of the computing device 102. The items may be stored locally in memory of the computing device 102, remotely accessible via a network, represent devices that are communicatively coupled to the computing device 102, and so on. Thus, a variety of different types of gestures may be recognized by the input/output module 104, such a gestures that are recognized from a single type of input (e.g., touch gestures such as the previously described drag-and-drop gesture) as well as gestures involving multiple types of inputs, e.g., compound gestures.

A variety of other inputs may also be detected and processed by the input/output module 104, such as from a keyboard, cursor control device (e.g., mouse), stylus, track pad, and so on. In this way, the applications 106 may function without "being aware" of how operations are implemented by the computing device 102. Although the following discussion may describe specific examples of gesture, keyboard, and cursor control device inputs, it should be readily apparent that these are but a few of a variety of different examples that are contemplated for use with the techniques described herein.

The user interface in this illustrated example includes use of a plurality of tiles 112 as previously described. Thus, a user may directly interact with the user interface efficiently, e.g., using one or more fingers of the user's hand 110 to select a tile, move tiles, perform gestures, and so on. However, other configurations of user interfaces may also be output for display by the display device 108. Accordingly, the input/output module 104 may employ a touch mode module 114 that may support a variety of different modes for interaction using touchscreen functionality of the display device 108.

For example, in the user interface of FIG. 1 a first mode may be supported in which a user may directly interact with the user interface, such as to select an item (e.g., a tile) using a finger of the user's hand 110. Thus, in this mode direct interaction is supported that is at least partially dependent on a location at which the object is detected as proximal to the display device 108. However, other user interfaces may be configured such that it may be difficult to interact with the items using direct interaction, an example of which is described in relation to the following figure.

Figure 2:
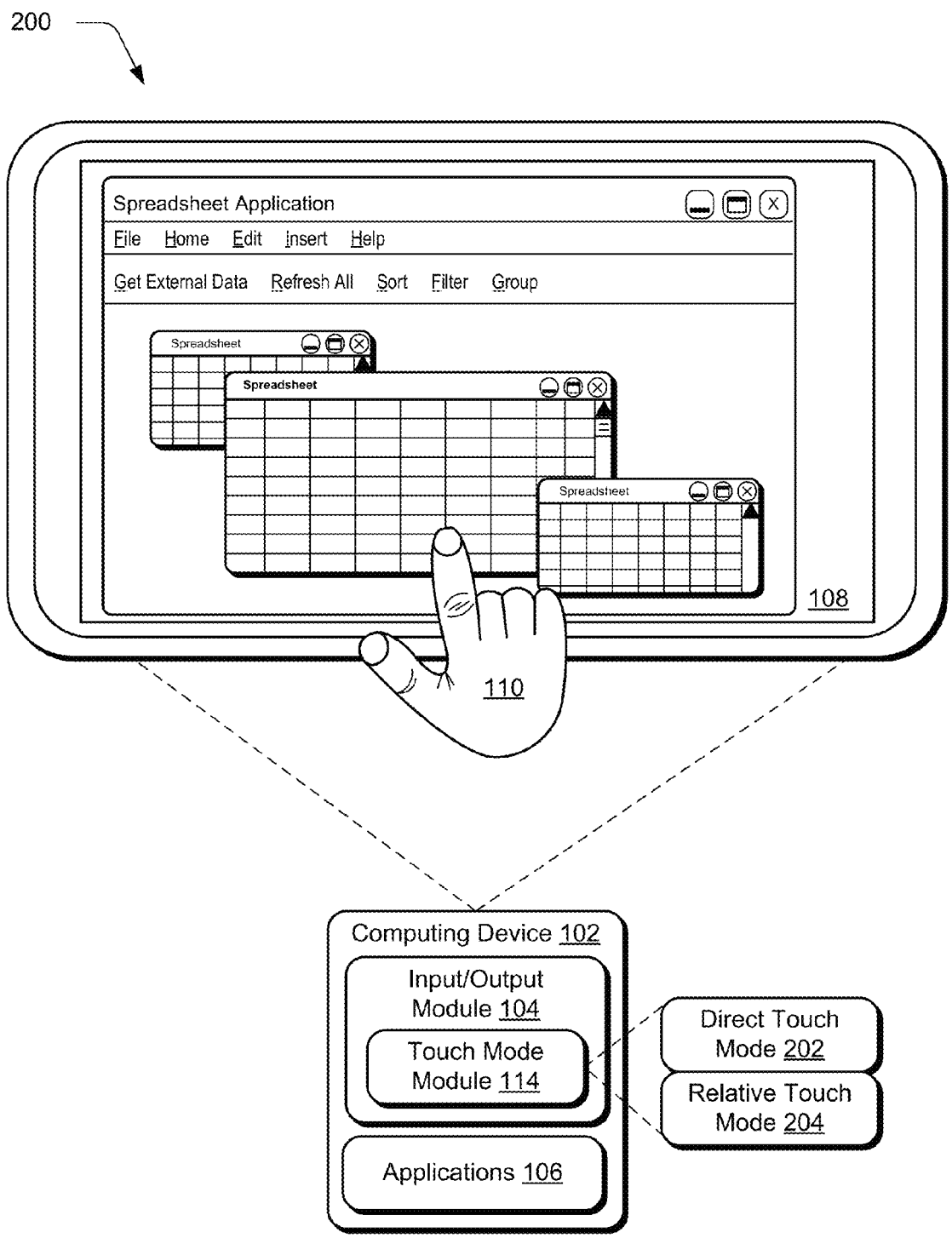
FIG. 2 illustrates an example implementation in which a touch mode module of FIG. 1 is shown in greater detail.

FIG. 2 illustrates an example implementation 200 in which the touch mode module 114 of FIG. 1 is shown in greater detail. In this example, a user interface is displayed by the display device 108 for the application 106 that is configured in this instance as a spreadsheet application. Accordingly, a plurality of spreadsheets is shown having a plurality of cells each. Because of the size of the display device, number of elements in the user interface, obscuring of an element that is to be selected by a finger of the user's hand, and so on, difficulty in selecting a particular item in the user interface using direct interaction may be greater than that of the user interface displayed in FIG. 1.

Accordingly, the touch mode module 114 may support a plurality of different modes to support different types of interaction with the user interface using touchscreen functionality of the display device 108. The touch mode module 114, for instance, may support a direct touch mode 202 that may be used to support direct interaction with the user interface as described in relation to FIG. 1. The direct interaction, for instance, may be dependent on a location at which an object is detected as proximal to the display device 108.

A user, for instance, may tap a display of a tile to launch an application represented by the tile. However, it may be difficult to employ such a tap in the user interface in FIG. 2, such as due to a size of an item (e.g., a particular cell) as displayed by the display device 108, proximity of other items that are also selectable to an item of interest (e.g., the other cells), and so forth. Accordingly, the touch mode module 114 may also include another mode which in this example is called a relative touch mode 204 which may be used to support indirect interaction with the user interface, an example of which is described in relation to the following figure.

Figure 3:
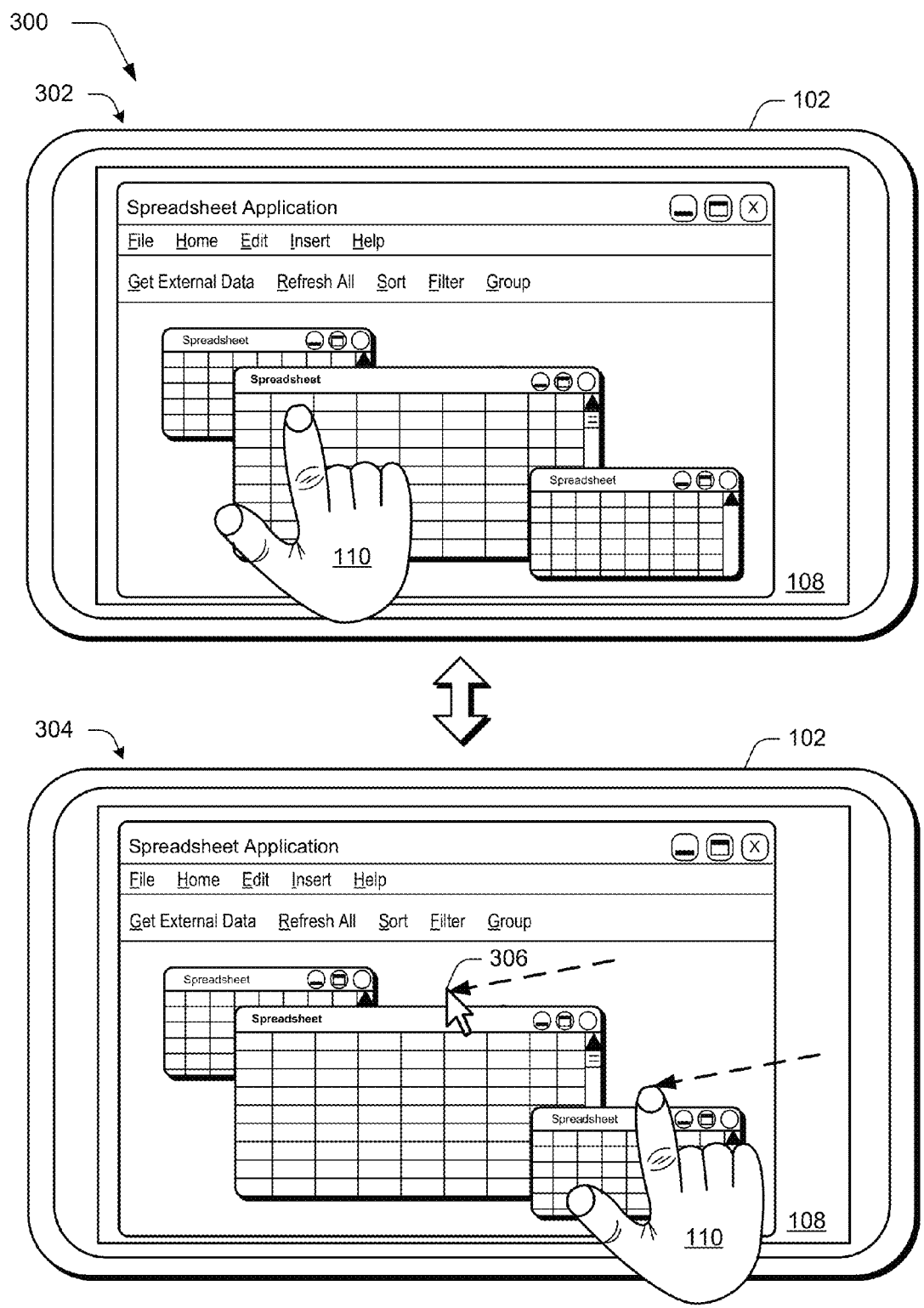
FIG. 3 depicts example implementation of different modes by a touch mode module of FIG. 2.

FIG. 3 depicts example implementation 300 of different modes by the touch mode module 114 of FIG. 2. In the first example 302, a user interface of a spreadsheet application is displayed on the display device 108 as previously described. In this example, a first mode (e.g., the direct touch mode 202) is utilized to support interaction with the user interface. Therefore, to select a particular cell in the spreadsheet a user taps or presses that cell using a finger of the user's hand 110. However, as previously described this may be difficult to perform due to the size of the cells and so on, especially if a user desires to select content within the cell.

Accordingly, a user may provide an input to cause the touch mode module 114 to switch to another mode, e.g., the relative touch mode 204, as shown in the second example 304. In this mode, a cursor 306 is utilized to interact with the user interface, such as to select items, navigate through the user interface, move items, and so on. A user may control the cursor using the touchscreen functionality. However, in this instance the control is relative and is not dependent on a location of an object utilized to provide the input, e.g., the finger of the user's hand 110, in that a motion having matching results may be performed anywhere on the display device 108 in this example.

In the illustrated second example 304, for instance, movement of the cursor 306 is shown through use of a dashed arrow. This movement mimics movement of a finger of the user's hand 110 that is detected by the touchscreen functionality of the display device 108. However, the movement of the user's finger occurs at a different location of the display device 108 than that at which the movement of the cursor 306 occurs. Use of different speeds and even directions may also be supported as further described below. Thus, a magnitude and direction of the movement of the finger of the user's hand 110 may be used to control movement of the cursor 306 regardless of where that movement occurs on the display device 108. In this way, this mode may cause touchscreen functionality of the display device 108 to mimic that of a track pad to control the cursor 306.

For example, an object may be "picked up" such that the object is no longer detected as proximal to the display device, e.g., a finger of a user's hand. The user may then place the object back proximal to the device but not cause the cursor to "jump" to a new location. Rather, functionality may be provided similar to "sweeping a mouse" on a desktop in which a cursor does not move while the mouse is "in the air." Other examples are also contemplated as further described below. A user may switch between the modes in a variety of ways, examples of which are discussed in relation to the following figure.

Figure 4:
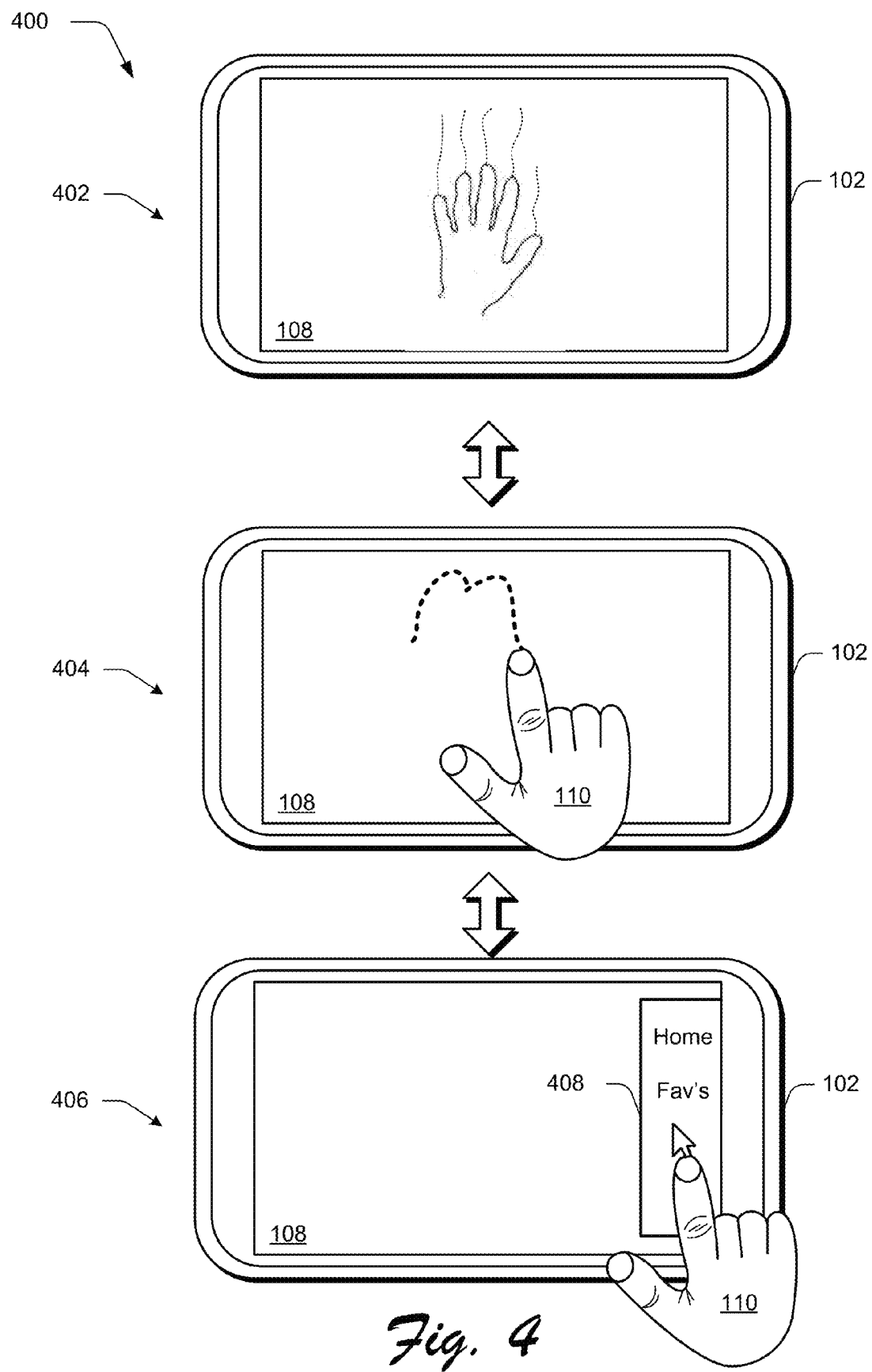
FIG. 4 depicts an example implementation in which first, second, and third examples are shown of inputs that may be utilized to switch between modes supported by the touch mode module.

FIG. 4 depicts an example implementation 400 in which first, second, and third examples 402, 404, 406 are shown of inputs that may be utilized to switch between modes supported by the touch mode module 114. In the first example 402, a gesture is shown that is detected using touchscreen functionality of the display device 108. This gesture involves use of five fingers and a dragging motion downward as illustrated by the dashed lines to toggle between modes supported by the touch mode module 114.

In the second example 404, another gesture is shown. In this instance, the gesture involves the tracing of a letter (e.g., "m") or other character as depicted using a dashed line to switch from one mode support by the touch mode module 114 to another. In the third example 406, a menu 408 is shown. The menu 408 may be output responsive to a variety of different inputs, such as an edge gesture in which a finger of the user's hand 110 is dragged away from an edge of the display device 108, a tap, and so on. The menu 408 includes functionality that is selectable, such as to navigate home or to a user's favorites. The menu 408 also includes an option that is illustrated using a cursor that is selectable to switch from a current mode to another mode supported by the touch mode module 114. A variety of other examples are also contemplated.

Regardless of the techniques used to switch between the modes, the touch mode module 114 may thus support a plurality of different modes that may be readily accessed to provide desired interaction. A user, for instance, may navigate a spreadsheet using the direct touch mode 202 of FIG. 2 and switch to a relative touch mode 204 to interact with a particular item of data. The user may then switch back to the direct touch mode 202 to continue navigation. It should be readily apparent that this is but one of a variety of different examples that may leverage use of the different modes supported by the touch mode module 114. Additional discussion of functionality supported by these modes may be found in relation to the following figure.

Figure 5:
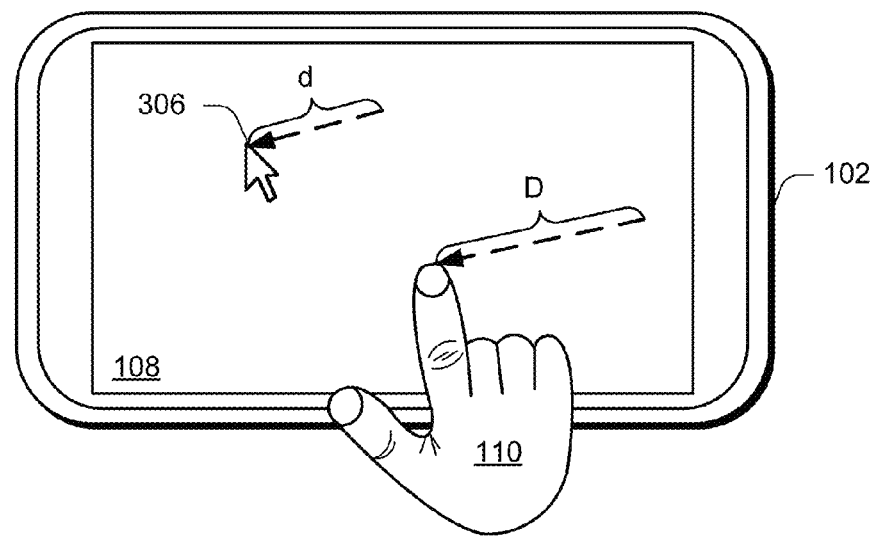
FIG. 5 depicts an example of a mode of the touch mode module in which movement of the cursor is controlled based on movement of an object as proximal to the display device in different amounts.

FIG. 5 depicts an example 500 of a mode of the touch mode module 114 in which movement of the cursor 306 is controlled based on movement of an object as proximal to the display device 108 in different amounts. In this example 500, an object is moved a distance "D" proximal to the display device 108, which is illustrated as a finger of the user's hand 110 and an arrow with a bracket showing the distance "D."

In response, the cursor 306 is moved a distance "d" by the touch mode module 114 that is different than the distance "D" moved by the finger of the user's hand 110. Thus, in this example 500 the user may be provided fine control of the movement of the cursor 306. Additional examples are also contemplated in which the movement of the cursor 306 is greater than the movement of the object.

Additionally, in one or more implementations the amount of movement of the cursor 306 in relation to the amount of movement of the object (e.g., the finger of the use's hand 110) may be user configurable. This may include setting a translation factor through interaction with a menu. In another example, this may include use of a pinch gesture to define the relative amounts, e.g., to increase or decrease a factor by pinching in or pushing one of two or more fingers of the user. Naturally, it should be readily apparent that a variety of other examples are also contemplated to set a relation of the distance "d" to distance "D."

Figure 6:
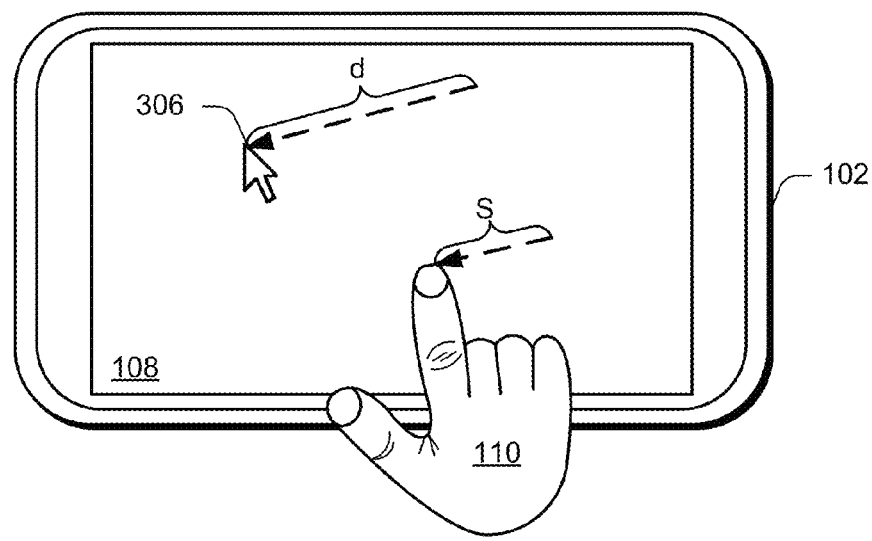
FIG. 6 depicts an example of a mode of the touch mode module in which movement of the cursor is controlled based on speed of movement of an object as proximal to the display device.

FIG. 6 depicts an example 600 of a mode of the touch mode module 114 in which movement of the cursor 306 is controlled based on speed of movement of an object as proximal to the display device 108. In the previous example, the distances traveled by the object and the cursor were different, e.g., based on a translation factor. The distances may also be different depending on a speed at which the object is moved as proximal to the display device 108.

An object, for instance, such as a finger of a user's hand 110 may be moved at a speed "s" across a distance of the display device 108. Depending on a value of the speed "s," a distance "d" may be calculated by the touch mode module 114 in which to move the cursor 306.

For example, a user may "flick" a finger to move the cursor 306 greater distances, move the finger slowly to move the cursor slowly over relatively short distances (in relation to the fast movement), and so on. This may be used, for instance, to quickly cover a distance from one side of the display device 108 to another and then to slowly move to select a particular item in a user interface at that side. Again, a variety of other examples are also contemplated.

Figure 7:
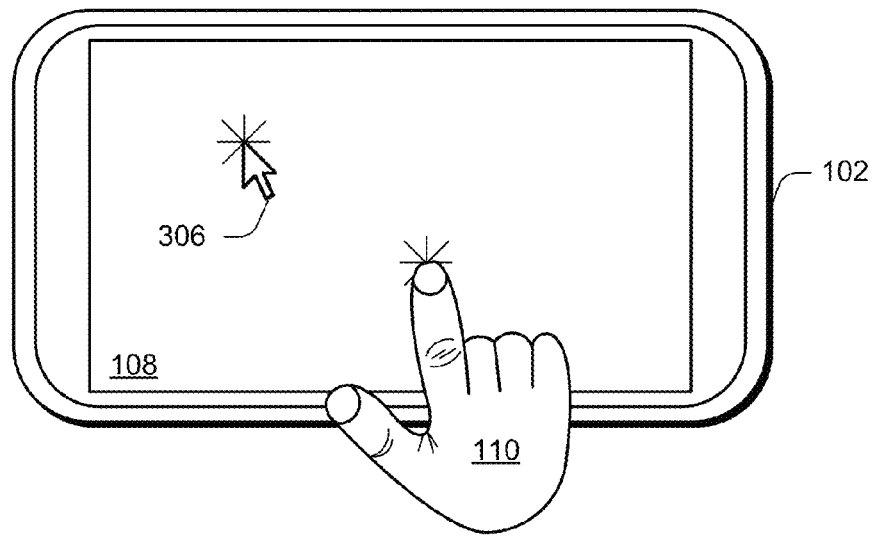
FIG. 7 depicts an example of a mode of the touch mode module in which the cursor is controlled based on detection of an action performed at a different location of the display device that does not involve lateral movement.

FIG. 7 depicts an example 700 of a mode of the touch mode module 114 in which the cursor 306 is controlled based on detection of an action performed at a different location of the display device that does not involve lateral movement. In the previous example, an object was moved proximal to the display device 108 to move the cursor 306. In this example, movement of the cursor 306 is not involved.

For example, the cursor 306 may be positioned at a location on the display device 108 that coincides with an item of interest, such as an icon, tile, cell, text, and so forth. To select that item, a finger of the user's hand 110 may be tapped against the display device 108. This is illustrated through use of a star at a location at which the user's finger is tapped and a star at a location of the cursor 306. As is readily apparent, these locations are different and further, such a tap by the finger of the user's hand 110 may be performed at a variety of different locations of the display device 110, such as at any location that is configured to determine proximity of the object. Thus, this is another example of independence of a location at which the object was detected from a location at which the operation occurs, which also causes the touchscreen functionality of the display device 108 to mimic a track pad. In the previous examples, gestures involving a single object (e.g., the finger of the user's hand 110) were described. Gestures involving detection of multiple objects are also contemplated, an example of which may be found in relation to the following figure.

Figure 8:
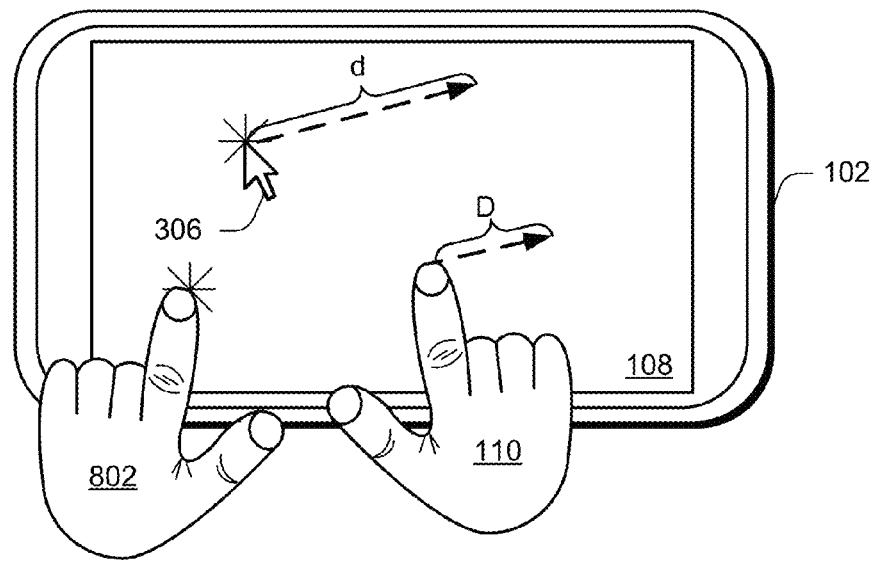
FIG. 8 depicts an example of a mode of the touch mode module in which the cursor is controlled based on detection of a plurality of objects as proximal to the display device.

FIG. 8 depicts an example 800 of a mode of the touch mode module 114 in which the cursor 306 is controlled based on detection of a plurality of objects as proximal to the display device 108. In this example, a click and drag operation is shown, such as to select and move an object in a user interface from one location to another.

A finger of a user's hand 802 is illustrated as causing the cursor 306 to select a current location at which the cursor 306 is positioned, e.g., a "click" at that location. The finger of the user's hand 802 may continue to be placed against the display device 108 as a finger of the user's hand 110 is moved a distance "D." Accordingly, the cursor 306 may be moved a distance as calculated by the touch mode module 114 as previously described, e.g., based on magnitude, speed, direction, and so forth.

Different magnitudes may be addressed, e.g., a displacement magnitude and a velocity magnitude. For example, a "location" may be defined as a pair of pixel coordinates on the display device to describe an absolute location of either the object (e.g., finger or stylus) the cursor (e.g., a displayed and movable icon on the screen), and so on. Displacement may be defined as a vector having both a direction and a magnitude. The magnitude of a displacement is its size, e.g., in inches or pixels. Velocity may be defined as a vector having both a direction and a magnitude. The magnitude of a velocity is its size in an amount of time, e.g., in inches per second or pixels per second. Motion may be defined using three pieces of data, a starting location, a displacement, and a velocity.

Accordingly, when the object is disposed proximal to the display device, the motion of the object may be detected relative to the device using touchscreen functionality. That motion may be mapped to another motion of the cursor on the screen. In such a mapping, any of the starting location, displacement, and velocity of the motion may be different between the object and the cursor. In the first mode, the mapping is direct in that it does not change anything in the motion. The starting location of the cursor may be defined as a centroid of the detected object, e.g., the finger, the displacement of the cursor during a motion is the displacement of the detected object, and the velocity of the cursor during a motion is the velocity of the detected object. In the second mode, however, any or all three of starting location, displacement and velocity of the cursor may be different from the starting location, displacement and velocity of the object.

Therefore, a mapping process may be performed based on a starting location, displacement, and velocity of a motion of the object to the starting location, displacement, and velocity of a corresponding motion of the cursor. This may be used to control the mapping parameters, e.g., an amount by which the starting location of a motion may be displaced from the starting location of the object, the amounts by which the direction and magnitude of the displacement of the object during the motion may be different from the direction and magnitude of the cursor. This may be performed likewise for the velocity, in which the amounts by which the direction and magnitude of the velocity of the object during the motion may be different from the direction and magnitude of the velocity of the cursor.

Example Procedures

The following discussion describes touch mode techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

FIG. 9 depicts a procedure 900 in an example implementation in which different modes of interaction are supported for a display device having touchscreen functionality. A first mode of interaction with a user interface displayed by a display device of a computing device having touchscreen functionality is supported, the first mode usable to interact directly with a user interface using the touchscreen functionality (block 902). The first mode, for instance, may support direct interaction that is dependent on a location detected for an object as proximal to the display device 108.

A second mode of interaction with the user interface displayed by the display device of the computing device, the second mode usable to control a cursor using the touchscreen functionality to interact with the user interface (block 904). The second mode, for instance, may support control of a cursor displayed in a display device. The cursor may be controlled using touchscreen functionality of the display device such that location of an object detected by the functionality is independent of a location of the cursor.

FIG. 10 depicts a procedure 1000 in an example implementation in which detected proximity of an object to a display device is used to control a cursor. An object is detected as proximal to a display device of a computing device using touchscreen functionality (block 1002). The object, for instance, may be one or more fingers of a user's hand, a stylus, or other object that is detectable using touchscreen functionality. As previously described, a variety of different touchscreen functionality may be used to detect an object, such as capacitive, resistive, acoustic, strain gauges, image sensors, acoustic, and so forth.

A cursor displayed as part of user interface by the display device is controlled, the controlling based at least in part on the detection of the object in relation to the display device as proximal to the display device but is independent of a location of the display device at which the object is detected using the touchscreen functionality (block 1004). As shown in FIGS. 3-8, for instance, touchscreen functionality of the display device 108 may be configured to mimic a track pad such that detect of an object is usable to control the cursor independent of where the object is detected relative to the cursor. A variety of other examples are also contemplated.

Example System and Device

Figure 11:
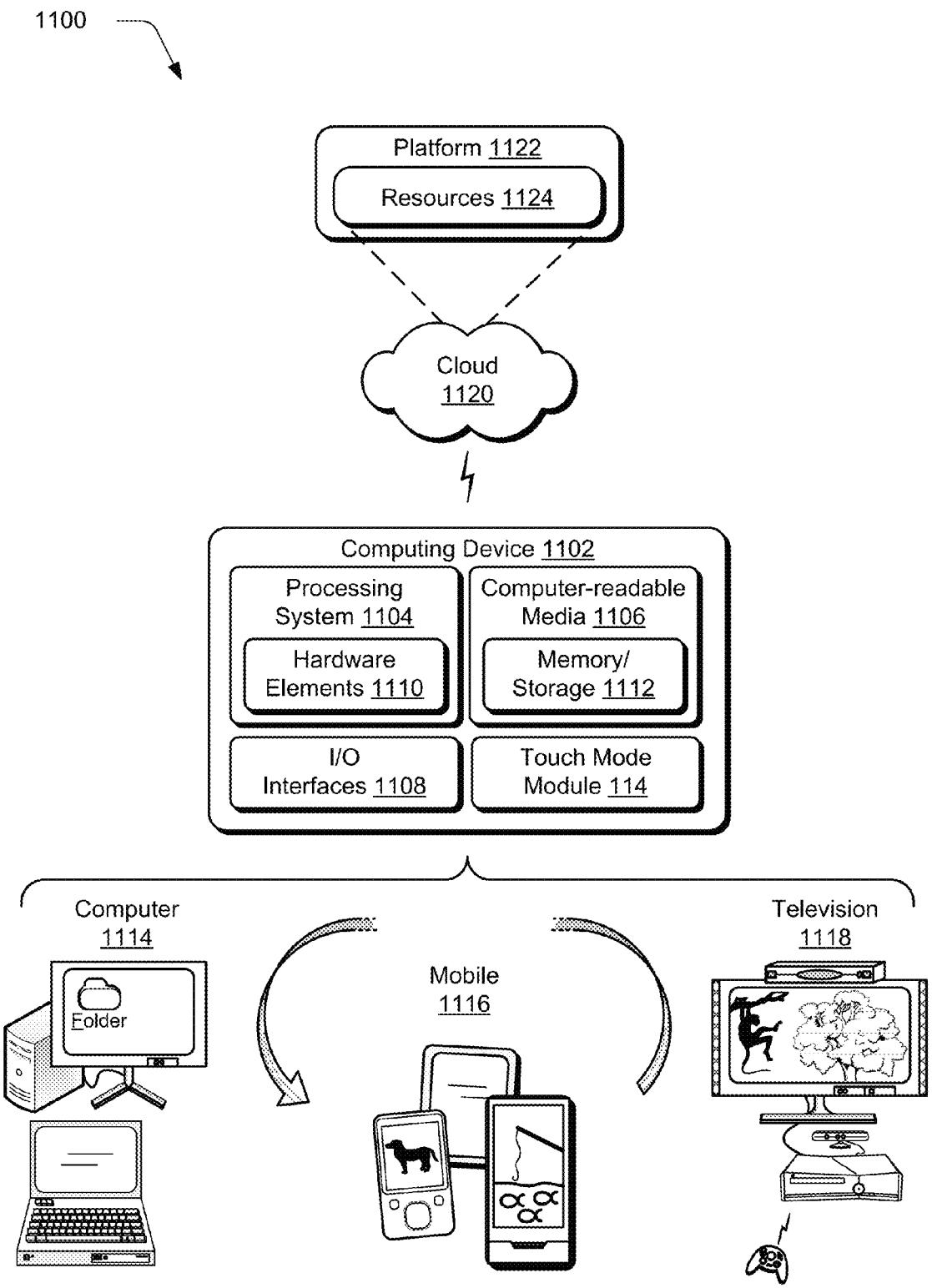
FIG. 11 illustrates various components of an example device that can be implemented as any type of portable and/or computer device as described with reference to FIGS. 1-10 to implement embodiments of the touch mode techniques described herein.

FIG. 11 illustrates an example system generally at 1100 that includes an example computing device 1102 that is representative of one or more computing systems and/or devices that may implement the various techniques described herein. The computing device 1102 may be, for example, a server of a service provider, a device associated with a client (e.g., a client device), an on-chip system, and/or any other suitable computing device or computing system that may leverage the touch mode module 114.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, portable music player, portable gaming device, a tablet computer, a multi-screen computer, and so on. The computing device 1102 may also be implemented as the television 1118 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. This functionality may also be implemented all or in part through use of a distributed system, such as over a "cloud" 1120 via a platform 1122 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer system, comprising:
   one or more processors;
   a display device that includes touchscreen functionality; and
   one or more computer-readable hardware storage devices having stored thereon computer-executable instructions that are executable by the one or more processors to cause the computer system to enable a user to interact with a user interface that is displayed by the display device, and further to cause the computer system to perform at least the following:
   detect an object as proximal to the display device using the touchscreen functionality;
   support a first mode of interaction with the user interface, wherein the first mode is usable to interact directly with the user interface using the touchscreen functionality, wherein the direct interaction depends on a detected location of the proximal object in relation to the user interface, and wherein the direct interaction is also dependent on an absolute movement of the proximal object;
   support a second mode of interaction with the user interface, wherein the second mode is usable to interact indirectly with the user interface by controlling a cursor that is displayed as part of the user interface, wherein the touchscreen functionality is usable to control a movement of the cursor, and wherein the indirect interaction is independent of the detected location of the proximal object and is at least partially dependent on a relative movement of the proximal object;

detect an amount or rate of the movement of the cursor in relation to the user interface and detect an amount or rate of the absolute movement of the proximal object in relation to the user interface, wherein the amount or rate of the movement of the cursor is different than the amount or rate of the absolute movement of the proximal object;

support a selection, using the second mode of interaction, of an item in the user interface, wherein the selection is detected by a single-touch input of the proximal object, and wherein a location on the user interface where the selection is to occur is based on a location of the cursor rather than on the detected location of the proximal object; and receive a user input that causes the computer system to switch between the first mode and the second mode, wherein the user input includes using the proximal object to trace a preselected character onto the display device.

2. The computer system in accordance with claim 1, wherein the first mode does not involve the cursor.

3. The computer system in accordance with claim 1, wherein the second mode is further usable to control the cursor such that the touchscreen functionality mimics a track pad.

4. The computer system in accordance with claim 1, wherein the user input further includes a multi-touch gesture.

5. The computer system in accordance with claim 1, wherein the amount or rate of the movement of the cursor is greater than the amount or the rate of the absolute movement of the proximal object.

6. The computer system in accordance with claim 1, wherein the difference between the amount or rate of the movement of the cursor and the amount or rate of the absolute movement of the proximal object is user configurable through a gesture.

7. The computer system in accordance with claim 1, wherein a menu is provided to switch between the first mode and the second mode.

8. A method, implemented at a computer system that includes one or more processors and a display device that includes touchscreen functionality, for enabling a user to interact with a user interface that is displayed by the display device, the method comprising:

detecting an object as proximal to the display device using the touchscreen functionality;

supporting a first mode of interaction with the user interface, wherein the first mode is usable to interact directly with the user interface using the touchscreen functionality, wherein the direct interaction depends on a detected location of the proximal object in relation to the user interface, and wherein the direct interaction is dependent on an absolute movement of the proximal object;

supporting a second mode of interaction with the user interface, wherein the second mode is usable to interact indirectly with the user interface by controlling a cursor that is displayed as part of the user interface, wherein the touchscreen functionality is usable to control a movement of the cursor, and wherein the indirect interaction is independent of the detected location of the proximal object in relation to the user interface and is at least partially dependent on a relative movement of the proximal object;

detecting an amount or rate of the movement of the cursor in relation to the user interface and detecting an amount or rate of the absolute movement of the proximal object in relation to the user interface, wherein the amount or rate of the movement of the cursor is different than the amount or rate of the absolute movement of the proximal object;

supporting a selection, using the second mode of interaction, of an item in the user interface, wherein the selection is detected by a single-touch input of the proximal object, and wherein a location on the user interface where the selection is to occur is based on a location of the cursor rather than on the detected location of the proximal object; and receiving a user input that causes the computer system to switch between the first mode and the second mode, wherein the user input includes using the proximal object to trace a preselected character onto the display device.

9. The method in accordance with claim 8, wherein the first mode does not involve the cursor.

10. The method in accordance with claim 8, wherein the second mode is further usable to control the cursor such that the touchscreen functionality mimics a track pad.

11. The method in accordance with claim 8, wherein the user input further includes a multi-touch gesture.

12. The method in accordance with claim 8, wherein the amount or rate of the movement of the cursor is greater than the amount or the rate of the absolute movement of the proximal object.

13. The method in accordance with claim 8, wherein the difference between the amount or rate of the movement of the cursor and the amount or rate of the absolute movement of the proximal object is user configurable through a gesture.

14. The method in accordance with claim 8, wherein a menu is provided to switch between the first mode and the second mode.

15. A computer program product comprising one or more computer-readable hardware storage devices having thereon computer-executable instructions that are executable by one or more processors of a computing system to cause the computing system to enable a user to interact with a user interface displayed by a display device of the computer system that includes touchscreen functionality by at least causing the computing system to implement:

an act of detecting an object as proximal to the display device using the touchscreen functionality;

an act of supporting a first mode of interaction with the user interface, wherein the first mode is usable to interact directly with the user interface using the touchscreen functionality, wherein the direct interaction depends on a detected location of the proximal object in relation to the user interface, and wherein the direct interaction is dependent on an absolute movement of the proximal object;

an act of supporting a second mode of interaction with the user interface, wherein the second mode is usable to interact indirectly with the user interface by controlling a cursor that is displayed as part of the user interface, wherein the touchscreen functionality is usable to control a movement of the cursor, and wherein the indirect interaction is independent of the detected location of the proximal object in relation to the user interface and is at least partially dependent on a relative movement of the proximal object;

an act of detecting an amount or rate of the movement of the cursor in relation to the user interface and detecting an amount or rate of the absolute movement of the proximal object in relation to the user interface, wherein the amount or rate of the movement of the cursor is different than the amount or rate of the absolute movement of the proximal object;

an act of supporting a selection, using the second mode of interaction, of an item in the user interface, wherein the selection is detected by a single-touch input of the proximal object, and wherein a location on the user interface where the selection is to occur is based on a location of the cursor rather than on the detected location of the proximal object; and an act of receiving a user input that causes the computer system to switch between the first mode and the second mode, wherein the user input includes using the proximal object to trace a preselected character onto the display device.

16. The computer program product in accordance with claim 15, wherein the first mode does not involve the cursor.

17. The computer program product in accordance with claim 15, wherein the second mode is further usable to control the cursor such that the touchscreen functionality mimics a track pad.

18. The computer program product in accordance with claim 15, wherein the user input further includes a multi-touch gesture.

19. The computer program product in accordance with claim 15, wherein the amount or rate of the movement of the cursor is greater than the amount or the rate of the absolute movement of the proximal object.

20. The computer program product in accordance with claim 15, wherein the difference between the amount or rate of the movement of the cursor and the amount or rate of the absolute movement of the proximal object is user configurable through a gesture.

* * * * *